United States Patent
Wingate et al.

(10) Patent No.: US 9,508,244 B2
(45) Date of Patent: Nov. 29, 2016

(54) SENSOR WITH A RADIANT INDICATOR

(71) Applicant: Zircon Corporation, Campbell, CA (US)

(72) Inventors: Barry Wingate, San Jose, CA (US); Chien-Hsu Chen, Millbrae, CA (US)

(73) Assignee: ZIRCON CORPORATION, Campbell, CA (US)

( * ) Notice: Subject to any disclaimer, the term of this patent is extended or adjusted under 35 U.S.C. 154(b) by 0 days.

(21) Appl. No.: 14/201,637

(22) Filed: Mar. 7, 2014

(65) Prior Publication Data
US 2015/0254959 A1 Sep. 10, 2015

(51) Int. Cl.
| | | |
|---|---|---|
| *G08B 21/00* | (2006.01) | |
| *G01R 19/00* | (2006.01) | |
| *G01B 7/14* | (2006.01) | |
| *G01C 15/00* | (2006.01) | |
| *G01J 5/02* | (2006.01) | |
| *G01J 1/00* | (2006.01) | |
| *G08B 21/18* | (2006.01) | |
| *G01V 99/00* | (2009.01) | |
| *G08B 5/36* | (2006.01) | |
| *G01V 3/15* | (2006.01) | |
| *G01V 11/00* | (2006.01) | |
| *G01D 11/28* | (2006.01) | |

(52) U.S. Cl.
CPC .......... *G08B 21/182* (2013.01); *G01V 3/15* (2013.01); *G01V 11/00* (2013.01); *G01V 99/00* (2013.01); *G08B 5/36* (2013.01); *G01D 11/28* (2013.01)

(58) Field of Classification Search
CPC .... G01R 19/00; G08B 21/00; G08B 21/182; G08B 5/36; G01V 99/00; G01V 3/165; G01N 27/22

USPC .................. 340/540, 686.1; 324/67, 207.11; 33/286; 250/339.11, 339.01; 356/123
See application file for complete search history.

(56) References Cited

U.S. PATENT DOCUMENTS

| | | | |
|---|---|---|---|
| 6,249,113 B1 | 6/2001 | Krantz et al. | |
| 7,287,336 B1 * | 10/2007 | Goodrich ............. | G01C 15/008 33/227 |
| 2003/0201783 A1 * | 10/2003 | Steber ..................... | G01V 3/15 324/661 |
| 2004/0256583 A1 * | 12/2004 | Hill .................... | H04N 1/00681 250/559.01 |
| 2007/0200547 A1 * | 8/2007 | Chen ....................... | G01V 3/15 324/67 |
| 2008/0186010 A1 | 8/2008 | Skultety-Betz et al. | |
| 2008/0196910 A1 | 8/2008 | Radle et al. | |
| 2010/0097212 A1 * | 4/2010 | Wingate .................. | G08B 5/36 340/540 |

OTHER PUBLICATIONS

International Search Report and Written Opinion—PCT/US2015/018327—ISA/EPO—Jun. 18, 2015.

* cited by examiner

*Primary Examiner* — George Bugg
*Assistant Examiner* — Munear Akki
(74) *Attorney, Agent, or Firm* — Silicon Valley Patent Group LLP

(57) ABSTRACT

An implementation of systems, devices and methods for a sensor to find a hidden element behind a surface are provided. The sensor includes a housing with a radiant indicator in a bottom section of the housing. The radiant indicator is translucent and acts as another indication that the sensor is over the hidden element. The sensor also includes a light source, such as an LED, which lights the radiant indicator with a beam, as well as optionally projecting an image on the surface, for example, formed by the bottom section and a top section of the housing. The same light source may also be used to project a second beam to an indicator on the top section of the housing.

20 Claims, 7 Drawing Sheets

FIG. 17

SENSOR WITH A RADIANT INDICATOR

BACKGROUND OF THE INVENTION

1. Field of the Invention

The invention relates generally to a sensor and more specifically to a sensor having a radiant indicator when the sensor passes over an element of interest hidden behind a surface.

2. Background of the Invention

When a wall is too brightly lit or a color of a projected indicator, a user of a sensor (such as a stud sensor or a handheld sensor to be used on a wall or other surface) may strain to see or even miss that an indication of a hidden element of interest (such as a wood stud, a metal pipe, electrical wiring or a fluid-filled plastic tube) behind a surface even when concentrating on the single indicator. Therefore, a need exists to provide multiple indicators to a user of a sensor when passing over a hidden element of interest.

BRIEF SUMMARY OF THE INVENTION

Provided is an implementation of systems, devices and methods for a sensor to find a hidden element behind a surface. The sensor includes a housing with a radiant indicator in a bottom section of the housing. The radiant indicator is translucent and acts as another indication that the sensor is over the hidden element. The sensor also includes a light source, such as an LED, which lights the radiant indicator with a beam, as well as optionally projecting an image on the surface, for example, formed by the bottom section and a top section of the housing. The same light source may also be used to project a second beam to an indicator on the top section of the housing.

Some embodiments of the present invention provide for a sensor configured to find a hidden element behind a surface, the sensor comprising: a housing comprising a top section and a bottom section, wherein the bottom section comprises a radiant indicator in a front portion of the bottom section; and circuitry coupled to the housing, wherein the circuitry comprises a light chamber having a light source and an opening, wherein the circuitry is configured to illuminate the radiant indicator by activating the light source; wherein the light chamber is configured to reflect light to the opening in the light chamber to form a beam; and wherein the radiant indicator is positioned to receive the beam.

Some embodiments of the present invention provide for a method for finding a hidden element behind a surface using a sensor, the method comprising: detecting the hidden element; activating a light source to emit a light, based on detecting the hidden element; reflecting the light in a light chamber; forming a beam through an opening in a light chamber; and illuminating a radiant indicator with the beam.

Some embodiments of the present invention provide for a sensor configured to find a hidden element behind a surface, the sensor comprising: means for detecting the hidden element; means for activating a light source to emit a light, based on the means for detecting the hidden element; means for reflecting the light; means for forming a beam based on the means for reflecting the light; and means for illuminating a radiant indicator with the beam.

These and other aspects, features and advantages of the invention will be apparent from reference to the embodiments described hereinafter.

BRIEF DESCRIPTION OF THE SEVERAL VIEWS OF THE DRAWINGS

Embodiments of the invention will be described, by way of example only, with reference to the drawings.

DETAILED DESCRIPTION OF THE INVENTION

In the following description, reference is made to the accompanying drawings, which illustrate several embodiments of the present invention. It is understood that other embodiments may be utilized and mechanical, compositional, structural, electrical, and operational changes may be made without departing from the spirit and scope of the present disclosure. The following detailed description is not to be taken in a limiting sense. Furthermore, some portions of the detailed description that follows are presented in terms of procedures, steps, logic blocks, processing, and other symbolic representations of permutations on data bits that can be performed in electronic circuitry or on computer memory. A procedure, computer executed step, logic block, process, etc., are here conceived to be a self-consistent sequence of steps or instructions leading to a desired result. The steps are those utilizing physical manipulations of physical quantities. These quantities can take the form of electrical, magnetic, or radio signals capable of being stored, transferred, combined, compared, and otherwise manipulated in electronic circuitry or in a computer system. These signals may be referred to at times as bits, values, elements, symbols, characters, terms, numbers, or the like. Each step may be performed by hardware, software, firmware, or combinations thereof.

Figure 1:
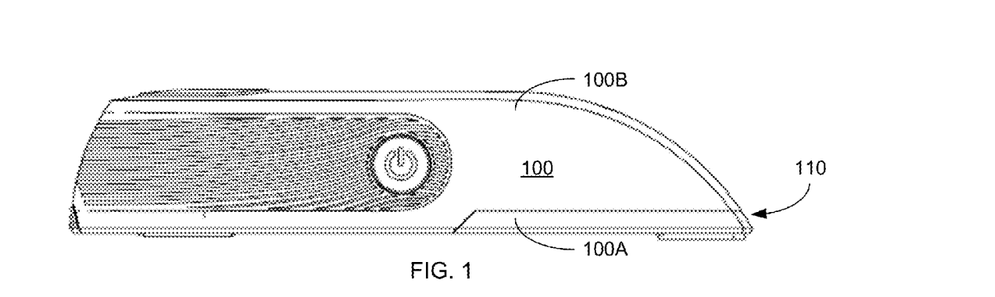
FIG. 1 shows a side view of a sensor 100, in accordance with some embodiments.

FIG. 1 shows a side view of a sensor 100, in accordance with some embodiments. A sensor 100 is described below as an example device but in some embodiments another wall, floor, ceiling or surface device may be used. In some embodiments, a sensor 100 includes a housing having a bottom section 100A and a top section 100B. In some embodiments, the bottom section 100A includes a radiant indicator 110 at the front section made with a translucent material. The radiant indicator 110 may comprise the entire forward-facing bottom section 100A. Alternatively, the radiant indicator 110 may comprise only a minority of the forward-facing bottom section 100A (e.g., just a small section or just a tab-insert section, such as lens insert 500 in FIGS. 9-11 described below). Alternatively, the radiant indicator 110 may comprise an area between an entire width of the forward-facing bottom section 100A and a minority of the forward-facing bottom section 100A.

A user sees light through a translucent material of the radiant indicator 110 as a glow. A translucent material may be clear or diffused. Examples of a translucent material included glass and many types of clear or foggy plastic that allows light to pass through. In an embodiment, a radiant indicator 110 at the front section is made of plastic that defuses light and appears to glow when an internal light emitting diode (such as LED 200) illuminates the radiant indicator 110 from the inside. A light source (e.g., from an LED) internal to the sensor 100 causes a front of the bottom section 100A of the sensor 100 to glow or radiate diffuse light. In some embodiments, when the sensor 100 passes over a hidden object or other hidden element (such as a wood stud, water pipe electrical wiring, metal tubing, a temperature differential), the radiant indicator 110 indicates that the hidden element is below the bottom section 100A of the sensor 100. A sensor 100 may also have one or more other indicators, such as a projected line, projected arrow, or display 300, that lights up to indicate a hidden element. The radiant indicator 110 is passive in that it has no active parts and only allows light to pass through it.

Figure 2:
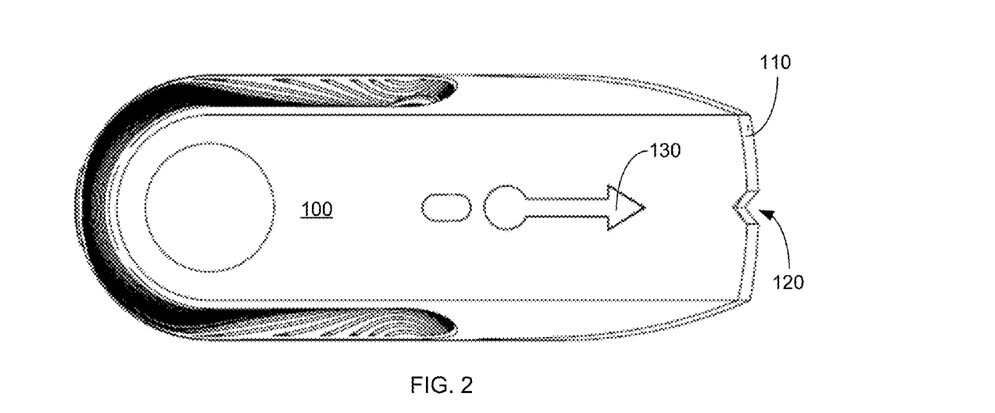
FIG. 2 shows a top view of a sensor 100, in accordance with some embodiments.

FIG. 2 shows a top view of a sensor 100, in accordance with some embodiments. This embodiment of the sensor 100 includes a radiant indicator 110, a center indicator 120 and a body indicator 130. By glowing or radiating, the radiant indicator 110 indicates when the center of the sensor 100 passes over a hidden element. The center indicator 120 passively indicants the center of the sensor 100, for example, with a notch. The body indicator 130 illuminates when the center of the sensor 100 passes over a hidden element. The body indicator 130 may be a display 300 (e.g., a liquid crystal display (LCD) and/or an indicator supplied by LED 200). In this case, multiple indicators may illuminate when the center of the sensor 100 passes over a hidden element: the radiant indicator 110 and the body indicator 130 both supplied with a common LED 200. An additional indicator or more indicators, such as a projected line or projected arrow, may also be used. Advantageously, a common LED 200 (i.e., one LED) may be used for the radiant indicator 110 and the body indicator 130, as well as the one or more additional indicators, such as the projected arrow or other projected image 240 against an adjacent surface.

Figure 3:
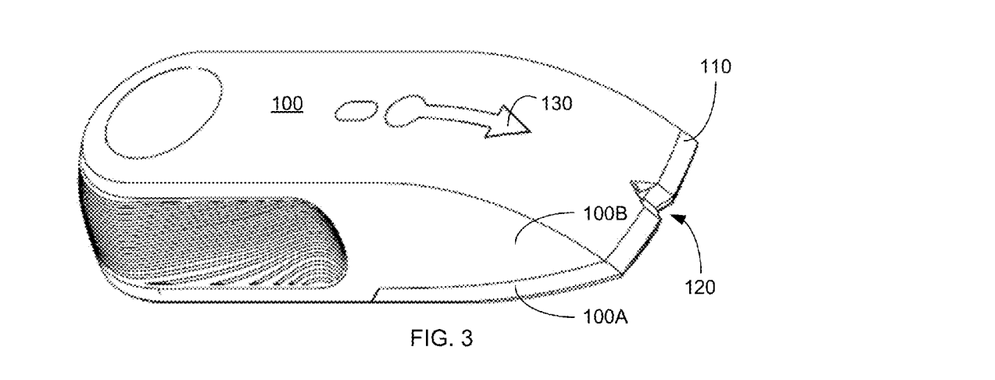
FIG. 3 shows a perspective view of a sensor 100, in accordance with some embodiments.
Figure 4:
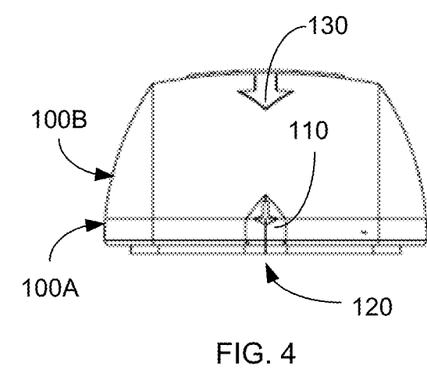
FIG. 4 shows a front view of a sensor 100, in accordance with some embodiments.

FIG. 3 shows a perspective view of a sensor 100, in accordance with some embodiments. As with FIGS. 1 and 2, the sensor 100 includes a bottom section 100A and a top section 100B. The bottom section 100A includes the radiant indicator 110 and part of the center indicator 120. The top section 100B includes the body indicator 130 and part of the center indicator 120. FIG. 4 shows a front view of a sensor 100, in accordance with some embodiments. The sensor 100 again includes a bottom section 100A and a top section 100B. The bottom section 100A includes the radiant indicator 110 and part of the center indicator 120. The top section 100B includes the body indicator 130 and part of the center indicator 120.

Figure 5:
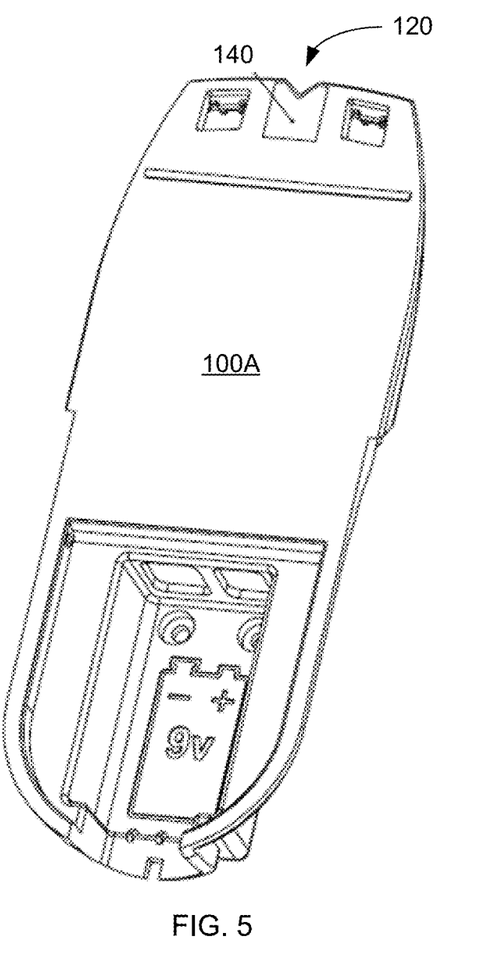
FIG. 5 shows a perspective view of a bottom section 100A of a sensor 100, in accordance with some embodiments.

FIG. 5 shows a perspective view of a bottom section 100A of a sensor 100, in accordance with some embodiments. The bottom section 100A of the sensor 100 includes part of the center indicator 120 and a backing 140. The backing 140 may be painted or otherwise placed on the bottom of the bottom section 100A (e.g., along with other painted on information, such as device instructions). Alternatively, the backing 140 may be taped on and/or integrated with the radiant indicator 110. The backing 140 is usually white to reflect light and acts as a contrast between a surface of interest and the radiant indicator 110. The radiant indicator 110 reflects light passing through the radiant indicator 110 out a front portion of the radiant indicator 110 for a user to see. The bottom section 100A of the sensor 100 also includes a battery storage compartment.

Figure 6:
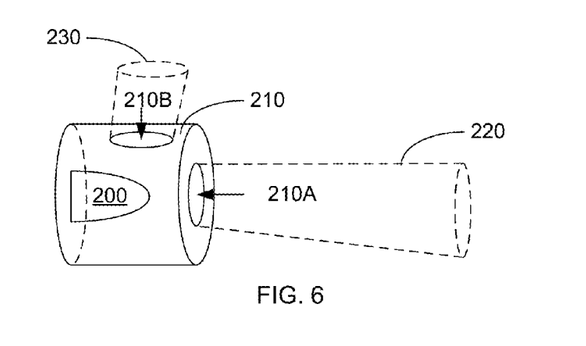
FIG. 6 shows an LED chamber 210 of a sensor 100, in accordance with some embodiments.

FIG. 6 shows an LED chamber 210 of a sensor 100, in accordance with some embodiments. A light source in a light chamber has one or more opening to allow light from the light source to project as beams. For example, an LED chamber 210 houses an LED 200 and has opening 210A and second opening 210B, which allow light from the LED 200 to project as a beam 220 and a second beam 230. The LED chamber 210 reflects light from the LED 200 off of a light surface (e.g., a white surface) or a reflective surface to the one or more openings. Without the LED chamber 210, light from the LED 200 may appear dimmer to a user. Because light from a standard LED, such as LED 200, is most intense from its top region, the LED chamber 210 is optimally open (e.g., at opening 210A) at the top of the LED 200. A standard LED also projects a halo in a ring perpendicular from the standard LED, one or more second openings (e.g., second opening 210B) are usually positioned around this ring.

Figure 7:
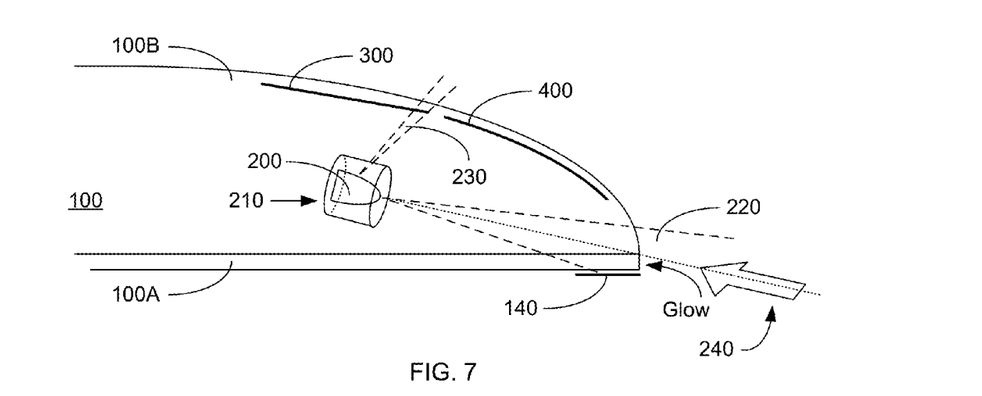
FIGS. 7 and 8 show a side view of a front section of a sensor 100, in accordance with some embodiments.
Figure 8:
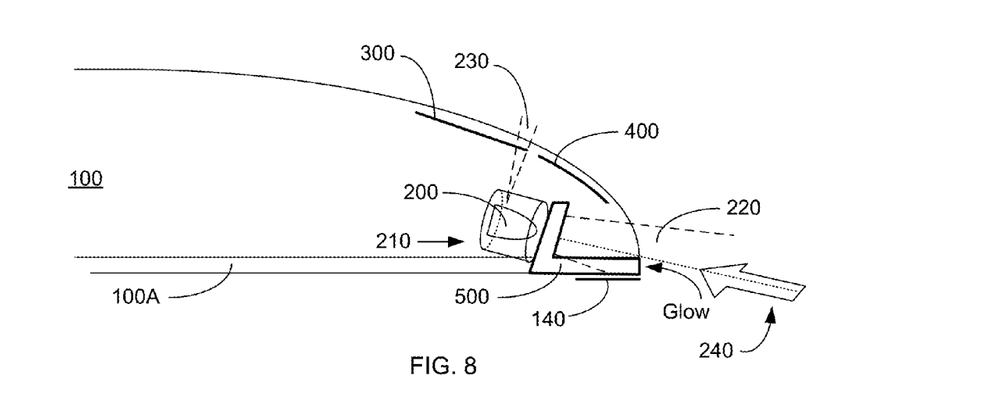

FIGS. 7 and 8 show a side view of a front section of a sensor 100, in accordance with some embodiments. In FIG. 7, a sensor 100 does not include a lens insert 500. The sensor 100 includes a bottom section 100A and a top section 100B. The bottom section 100A includes an LED 200 on a circuit board (not shown). The front of the bottom section 100A is translucent and has a backing 140 to reflect light from the LED 200. The LED 200 may be housed in an LED chamber 210 also attached to the circuit board. Light from the top of the LED 200 escapes through an opening 210A of the LED chamber 210 to emit light as beam 220. Light from a side on the LED 200 also escapes through a second opening 210B of the LED chamber 210 to emit light as a second beam 230.

The top section 100B includes a display 300 and an opaque material 400. The display 300 may be notched such that light from the second beam 230 passes through the outside perimeter of the display 300. Alternatively, light may pass above the display 300. The opaque material 400 may be made of a thin coat of rubber (e.g., used as a gasket between the bottom section 100A and top section 100B). The opaque material 400 may butt against the display 300 to allow light from the second beam 230 to pass only through the notch 310. Alternatively, the opaque material 400 may be notched, cut or formed with an opening such that light from bean 230 passes either through the opening or between the opening in the opaque material 400 and the display 300. The bottom section 100A and top section 100B, when placed together, form an optical opening to allow the beam 220 to form a projected image 240 against an adjacent surface.

In FIG. 8, a sensor 100 includes a lens 510, which concentrates light from the LED 200 and allows the LED 200 to be placed closer to a projected image 240. As described above, a sensor 100 includes a bottom section 100A and a top section 100B. The top section 100B includes a display 300 and an opaque material 400, however, the bottom section 100A includes a lens insert 500 having a lens 510 in this embodiment. Again, the bottom section 100A includes an LED 200 on a circuit board (not shown). The front of the bottom section 100A is translucent and has a backing 140 to reflect light from the LED 200. The LED 200 may be attached to the circuit board closer towards the front end of the circuit board next to the lens 510. The lens 510 may both concentrate the beam 220 and also provide a translucent area (i.e., radiant indicator 110) to allow the front of the bottom section 100A to radiate light. In this example, the lens insert 500 is coupled to the bottom section 100A of the housing. The lens insert 500 includes a lens 510 configured to optically connect the beam 220 to the radiant indicator 110.

Figure 9:
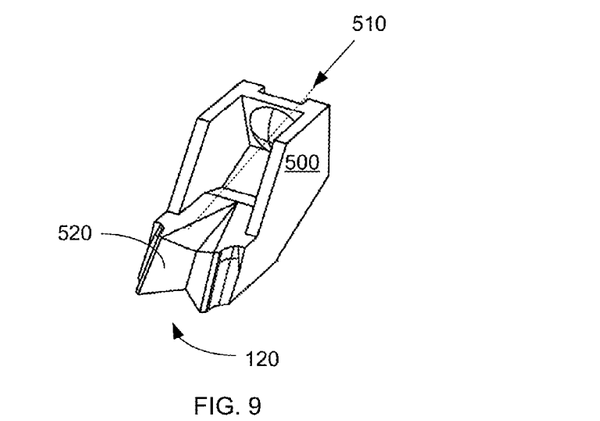
FIG. 9 shows lens insert 500 of a sensor 100, in accordance with some embodiments.

FIG. 9 shows lens insert 500 of a sensor 100, in accordance with some embodiments. A lens assembly may be integrated with a bottom section 100A, a top section 100B or circuitry 150 of the sensor 100. Alternatively, the lens assembly may be a lens insert 500, for example, as show. The lens insert 500 includes a lens 510 and may include a notch 520 acting as either or both of the radiant indicator 110 and a center indicator 120 of the sensor 100. In some embodiment, the lens insert 500 is formed from a single piece of clear plastic. Using a single piece of plastic reduces a bill of material part count by forming unrelated parts (e.g., a lens 510 and a radiant indicator 110) with at a common time.

Figure 10:
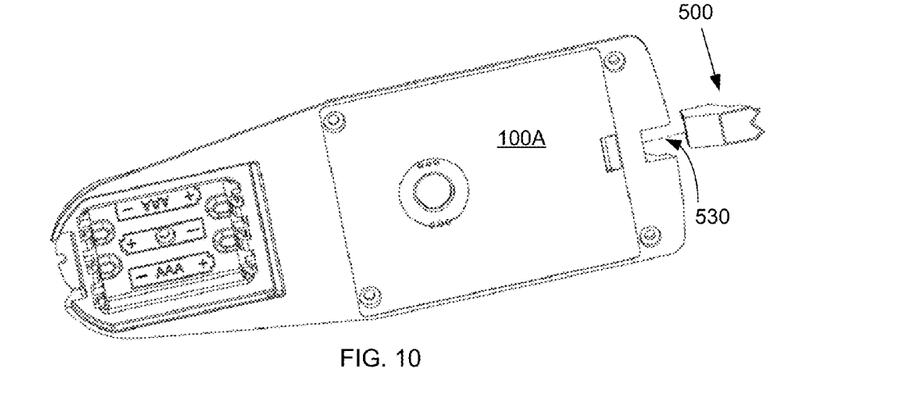
FIGS. 10 and 11 show bottom views of a bottom section 100A of a sensor 100, in accordance with some embodiments.
Figure 11:
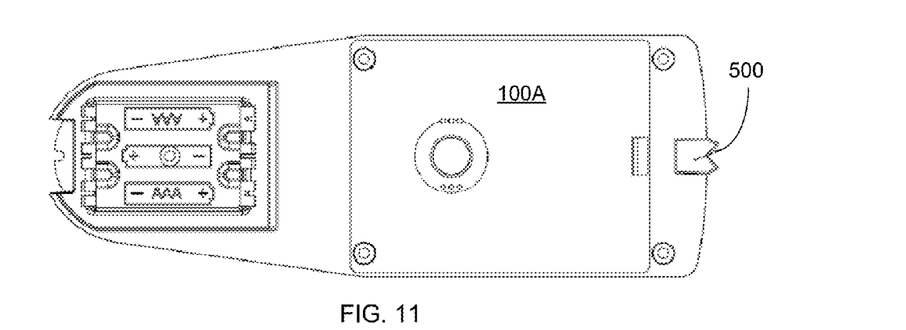

FIGS. 10 and 11 show bottom views of a bottom section 100A of a sensor 100, in accordance with some embodiments. In FIG. 10, the lens insert 500 is shown about to be inserted into a notch 530 formed in the bottom section 100A. In FIG. 11, the lens insert 500 is shown already inserted into a notch 530 formed in the bottom section 100A. FIGS. 10 and 11 also show a battery storage compartment.

Figure 12:
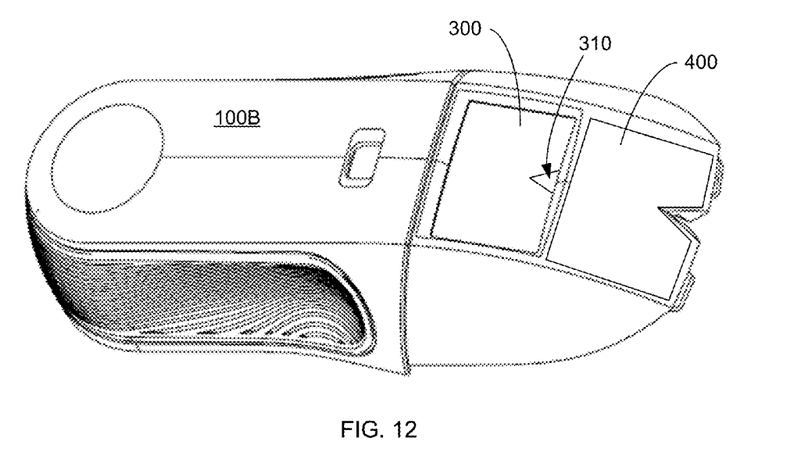
FIGS. 12 and 13 show a perspective view and a side view, respectively, of a top section 100B of a sensor 100, in accordance with some embodiments.
Figure 13:
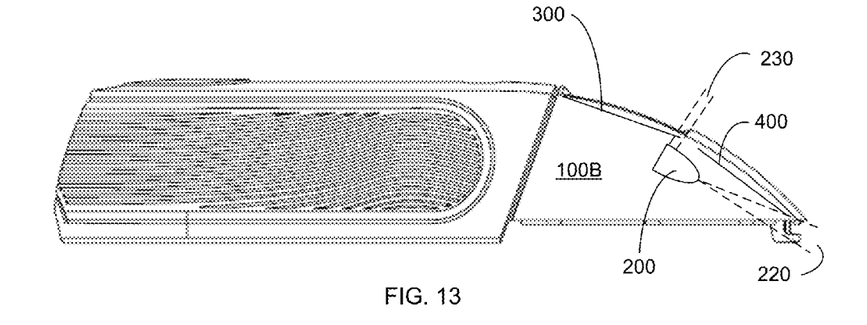
Figure 14:
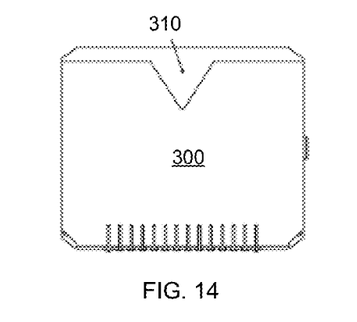
FIG. 14 shows a display 300 of a sensor 100, in accordance with some embodiments.

FIGS. 12 and 13 show a perspective view and a side view, respectively, of a top section 100B of a sensor 100, in accordance with some embodiments. The figures show a top section 100B of a sensor 100 having a display 300 with a notch 310. The figures also show an opaque material 400, which does not let light from the light source pass, and an LED 200. A beam 220 passes from the front of the LED 200. A second beam 230 passed between the display 300 and the opaque material 400 (e.g., via a notch 310 in the display 300 and/or a cutout of the opaque material 400 and/or a gap between the display 300 and the opaque material 400. FIG. 14 shows a display 300 of a sensor 100, in accordance with some embodiments. In this case, a notch 310 is formed in the display 300 to form a notched display in order to pass light from a second beam 230.

Figure 15:
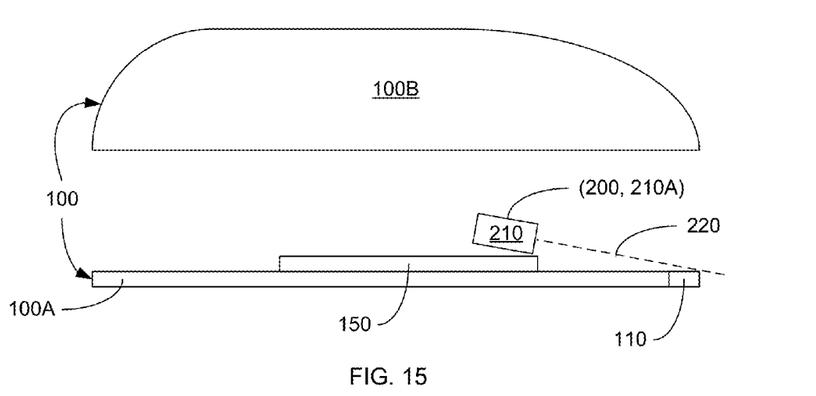
FIG. 15 illustrates a sensor 100 configured to find a hidden element behind a surface, in accordance with some embodiments.

FIG. 15 illustrates a sensor 100 configured to find a hidden element behind a surface, in accordance with some embodiments. The sensor 100 comprises a housing with a top section 100B and a bottom section 100A, wherein the bottom section 100A comprises a radiant indicator 110 in a front portion of the bottom section 100A. The radiant indicator 110 is form with a translucent material either as an insertable piece (e.g., lens insert 500) or directly in the bottom section 100A. The top section 100B and the bottom section 100A may form an opening in the housing configured to a form an image against an adjacent surface.

The insertable piece may provide isolation between the sensor's electronics and the outside of the sensor 100. The radiant indicator 110 may include a backing 140 to the radiant indicator 110 to provide a contrast to the radiant indicator 110. That is, light that passed through the radiant indicator 110 is more vivid when the radiant indicator 110 includes a backing 140 on the bottom side 100A of the sensor 100.

The sensor 100 also comprises circuitry 150 coupled to the housing (e.g., via the bottom section 100A). The circuitry 150 also comprises a light chamber (e.g., LED chamber 210) having a light source (e.g., LED 200) and an opening 210A. Light from the light source may be enhanced with the light chamber, which reflects light from the light source to the opening 210A thereby intensify the light. That is, much of the light not being used is reflected to an opening 210A where the light is being used. The circuitry 150 is configured to illuminate the radiant indicator 110 by activating the light source. The reflected light at the opening 210A in the light chamber forms a beam 220 to illuminate the radiant indicator 110. A backing 140 added to an under portion of the radiant indicator 110 may be used to provide a contrast to the radiant indicator 110. The radiant indicator 110 is positioned in the housing to receive the beam 220.

The sensor 100 may also include a display 300 (e.g., having a notch 310) and/or an opaque material 400. Light from the light source (e.g., from a second beam 230 from a second opening 210B) may illuminate an area of the notch 310, a cutout area in the opaque material 400, or a region between the display 300 and the opaque material 400. The notch 310 and the cutout of the opaque material 400 present a sharp image of the outline of the non-opaque opening bordering the display 300 and the opaque material 400.

Figure 16:
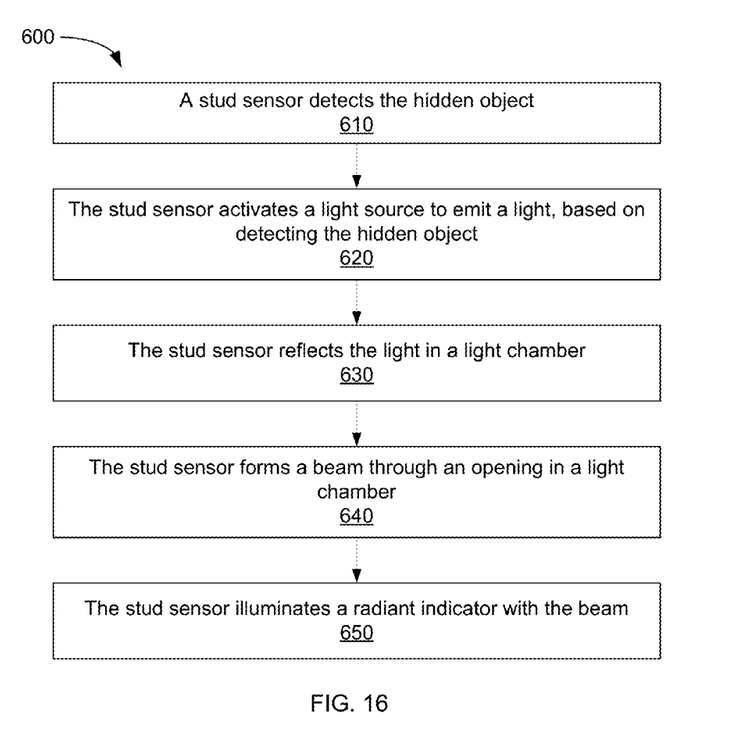
FIG. 16 illustrates a method 600 for finding a hidden element behind a surface using a sensor 100, in accordance with some embodiments.

FIG. 16 illustrates a method 600 for finding a hidden element behind a surface using a sensor 100, in accordance with some embodiments. At 610, the sensor 100 detects the hidden element. For example, the circuitry 150 and sensors in the sensor 100 detect the hidden element. At 620, the sensor 100 activates a light source to emit a light, based on detecting the hidden element. At 630, the sensor 100 reflects the light in a light chamber. Again, white sides of a light chamber reflect the light so less light is unused and wasted. At 640, the sensor 100 forms a beam 220 through an opening 210A in a light chamber. At 650, the sensor 100 illuminates a radiant indicator 110 with the beam 220. A lens 510 may be used to shorten a distance between the light source and the radiant indicator 110 and intensify or focus the light.

Figure 17:
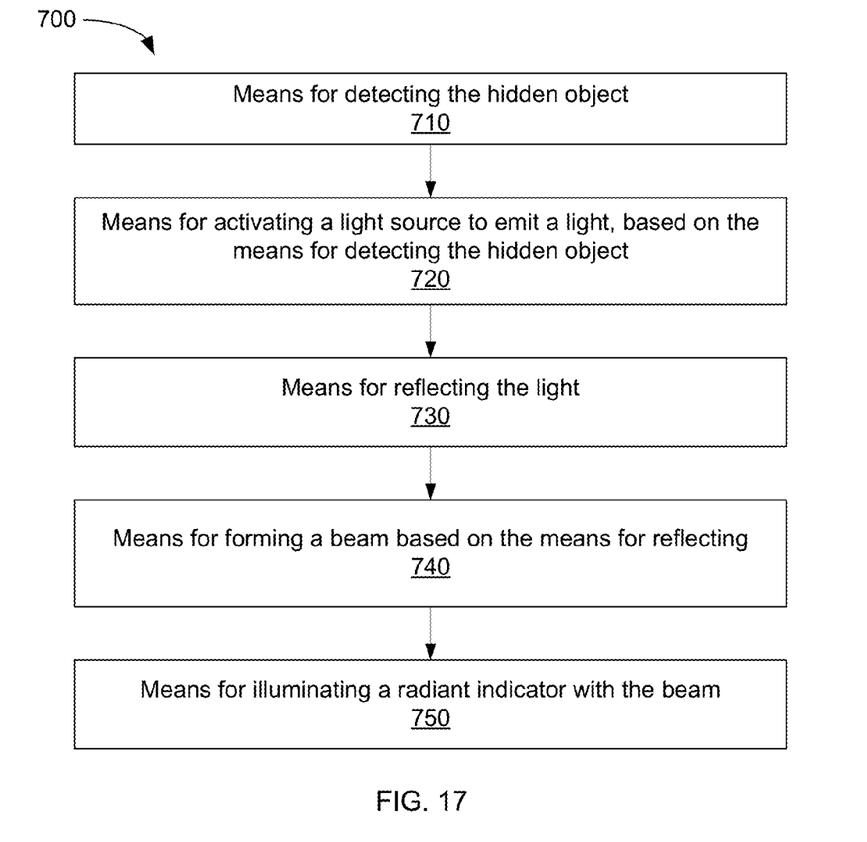
FIG. 17 illustrates another sensor 100 configured to find a hidden element behind a surface, in accordance with some embodiments.

FIG. 17 illustrates another sensor 700 (equivalent to sensor 100) configured to find a hidden element behind a surface, in accordance with some embodiments. At 710, circuitry 150 and associated sensor(s) act as a means for detecting the hidden element. At 720, the circuitry 150 again acts as a means for activating a light source (e.g., LED 200) to emit a light, based on the means for detecting the hidden element. At 730, a light chamber (e.g., LED chamber 210) acts as a means for reflecting the light. For example, the LED chamber 210 may be molded with white walls or from a piece of white plastic. At 740, an opening 210A acts as a means for forming a beam 220 based on the means for reflecting the light. At 750, the opening 210A also act as a mean for illuminating a radiant indicator 110 with the beam 220.

Therefore, it should be understood that the invention can be practiced with modification and alteration within the spirit and scope of the appended claims. The description is not intended to be exhaustive or to limit the invention to the precise form disclosed. It should be understood that the invention can be practiced with modification and alteration.

What is claimed is:

1. A sensor configured to find a hidden element behind a surface, the sensor comprising:
   a housing comprising a top section and a bottom section, wherein the bottom section comprises a radiant indicator in a front portion of the bottom section;
   circuitry coupled to the housing, wherein the circuitry comprises a light chamber having a light surface, a light source and an opening, wherein the circuitry is configured to illuminate the radiant indicator by activating the light source;
   a display positioned in the housing and coupled to the circuitry; and
   an opaque material, wherein the opaque material is a backing position at a bottom side of the sensor;
   wherein the light chamber is configured to reflect light from the light surface to the opening in the light chamber to form a first beam; and
   wherein the radiant indicator is positioned to receive the first beam.

2. The sensor of claim 1, further comprising a lens assembly coupled to the housing, wherein the lens assembly comprises a lens configured to optically connect the first beam to the radiant indicator.

3. The sensor of claim 2, wherein the lens assembly is insertable into the bottom section.

4. The sensor of claim 1, wherein the top section and the bottom section form an opening in the housing configured to form an image against an adjacent surface.

5. The sensor of claim 1, further comprising a backing to the radiant indicator to provide a contrast to the radiant indicator.

6. The sensor of claim 1, wherein the light chamber further comprises a second opening positioned to project a second beam to the display.

7. The sensor of claim 6, wherein the display comprises a notched display.

8. The sensor of claim 6, wherein the display comprises an LCD display.

9. The sensor of claim 6, wherein the second opening is further positioned to project the second beam to a material.

10. The sensor of claim 9, wherein the second beam passes between the display and the material.

11. The sensor of claim 1, wherein the radiant indicator is translucent and passive.

12. A method for finding a hidden element behind a surface using a sensor, the method comprising:
   detecting the hidden element with the sensor comprising a housing comprising a top section and a bottom section, wherein the bottom section comprises a radiant indicator in a front portion of the bottom section;
   activating a light source to emit a light, based on detecting the hidden element;
   reflecting the light from a light surface in a light chamber comprising the light surface;
   forming a first beam through an opening in the light chamber;
   illuminating an opaque material, wherein the opaque material is a backing position at a bottom side of the sensor;
   illuminating a radiant indicator with the first beam; and
   illuminating a display wherein the display is positioned in the housing and coupled to the circuitry.

13. The method of claim 12, further comprising optically connecting the first beam to the radiant indicator.

14. The method of claim 12, further comprising inserting a lens assembly into a front portion of a bottom section of a housing comprising a top section and the bottom section.

15. The method of claim 12, further comprising forming an opening in a housing, comprising a top section and a bottom section, configured to a form an image against an adjacent surface.

16. The method of claim 12, further comprising placing a backing to an under portion of the radiant indicator to provide a contrast to the radiant indicator.

17. The method of claim 12, further comprising:
   forming a second beam through a second opening in the light chamber;
   wherein illuminating the display comprises illuminating the display with the second beam.

18. The method of claim 12, further comprising:
   forming a second beam through a second opening in the light chamber; and
   illuminating a material with the second beam.

19. The method of claim 18, wherein part of the second beam passes between the display and the opaque material.

20. A sensor configured to find a hidden element behind a surface, the sensor comprising:
   means for detecting the hidden element with the sensor comprising a housing comprising a top section and a bottom section, wherein the bottom section comprises a radiant indicator in a front portion of the bottom section;
   means for activating a light source to emit a light in a light chamber, based on the means for detecting the hidden element;
   means for reflecting the light in the light chamber;
   means for forming a first beam based on the means for reflecting the light;
   means for illuminating an opaque material, wherein the opaque material is a backing position at a bottom side of the sensor;
   means for illuminating the radiant indicator with the first beam; and
   means for illuminating a display wherein the display is positioned in the housing and coupled to the circuitry.

* * * * *